(12) United States Patent
Parmeshwar et al.

(10) Patent No.: US 10,722,990 B2
(45) Date of Patent: Jul. 28, 2020

(54) METHOD FOR INSTALLING AND REMOVING MODULARIZED SILENCER BAFFLES

(71) Applicant: GENERAL ELECTRIC COMPANY, Schenectady, NY (US)

(72) Inventors: Naveen Ghattadhahalli Parmeshwar, Simpsonville, SC (US); Hua Zhang, Greer, SC (US); Bradly Aaron Kippel, Greenville, SC (US); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 15/267,019

(22) Filed: Sep. 15, 2016

(65) Prior Publication Data

US 2018/0071872 A1    Mar. 15, 2018

(51) Int. Cl.
| | |
|---|---|
| *B23P 15/04* | (2006.01) |
| *F16L 55/027* | (2006.01) |
| *F02C 7/045* | (2006.01) |
| *F01D 25/30* | (2006.01) |

(52) U.S. Cl.
CPC .............. *B23P 15/04* (2013.01); *F01D 25/30* (2013.01); *F02C 7/045* (2013.01); *F16L 55/02718* (2013.01); *F16L 55/02754* (2013.01); *F05D 2220/32* (2013.01); *F05D 2230/60* (2013.01); *F05D 2230/72* (2013.01); *F05D 2230/80* (2013.01); *F05D 2240/40* (2013.01); *F05D 2260/36* (2013.01); *F05D 2260/96* (2013.01)

(58) Field of Classification Search
CPC ....... F02C 7/045; B23P 15/04; F05D 2260/36
See application file for complete search history.

(56) References Cited

U.S. PATENT DOCUMENTS

| | | |
|---|---|---|
| 1,953,156 A | 4/1934 | Dahlman |
| 2,205,730 A | 6/1940 | Morgan |
| 2,299,112 A | 10/1942 | Schilling |
| 2,519,161 A | 8/1950 | Tucker |
| 2,759,554 A | 8/1956 | Baruch |
| 2,792,906 A | 5/1957 | Evans |
| 2,916,101 A | 12/1959 | Naman |
| 3,019,850 A | 2/1962 | March |
| 3,093,401 A | 6/1963 | Hagendoorn |
| 3,360,910 A | 1/1968 | Soltis |
| 3,423,908 A | 1/1969 | Hart |

(Continued)

FOREIGN PATENT DOCUMENTS

| | | |
|---|---|---|
| CA | 1148874 A1 | 6/1983 |
| CA | 2016596 | 11/1990 |

(Continued)

OTHER PUBLICATIONS

Machine Translation of JP60-066811U1 (Year: 1985).*

(Continued)

*Primary Examiner* — Christopher M Koehler
*Assistant Examiner* — Kyle A Cook
(74) *Attorney, Agent, or Firm* — Fletcher Yoder, P.C.

(57) ABSTRACT

A method includes assembling a silencer baffle configured to mount in a fluid conduit along a fluid flow path, where assembling the silencer baffle includes coupling together a plurality of baffle sections via mating interlock structures.

16 Claims, 9 Drawing Sheets

(56) References Cited

U.S. PATENT DOCUMENTS

| | | |
|---|---|---|
| 3,432,999 A | 3/1969 | Schraner |
| 3,487,768 A | 1/1970 | Watson |
| 3,511,337 A | 5/1970 | Pease et al. |
| 3,552,704 A | 1/1971 | Pond |
| 3,568,790 A | 3/1971 | Sankey |
| 3,576,096 A | 4/1971 | Rivers |
| 3,698,509 A | 10/1972 | Fitting et al. |
| 3,733,793 A | 5/1973 | Young |
| 3,740,934 A | 6/1973 | Shuler |
| 3,750,374 A | 8/1973 | Neumann |
| 3,759,017 A | 9/1973 | Young |
| 3,774,946 A | 11/1973 | Hamman |
| 3,783,768 A | 1/1974 | Caming et al. |
| 3,820,628 A * | 6/1974 | Hanson .............. F02C 7/045 181/214 |
| 3,837,149 A | 9/1974 | West et al. |
| 3,859,965 A | 1/1975 | Hatz et al. |
| 3,860,273 A | 1/1975 | Petrus |
| 3,891,253 A | 6/1975 | Revell |
| 3,893,640 A | 7/1975 | Hull, Jr. et al. |
| 3,916,817 A | 11/1975 | Kemp |
| 3,926,155 A | 12/1975 | Hatz et al. |
| 3,949,356 A | 4/1976 | Fuzzell et al. |
| 3,966,163 A | 6/1976 | Getzin |
| 3,993,464 A | 11/1976 | Pelabon |
| 3,999,969 A | 12/1976 | Shuler |
| 4,050,913 A | 9/1977 | Roach |
| 4,061,373 A | 12/1977 | Revell |
| 4,068,736 A | 1/1978 | Dean et al. |
| 4,167,986 A * | 9/1979 | Conway .............. F24F 13/24 181/224 |
| 4,171,211 A | 10/1979 | Carter |
| 4,178,159 A | 12/1979 | Fecteau |
| 4,193,844 A | 3/1980 | Neumann et al. |
| 4,217,122 A | 8/1980 | Shuler |
| 4,224,765 A | 9/1980 | Song |
| 4,266,956 A | 5/1981 | Revell |
| 4,276,069 A | 6/1981 | Miller |
| 4,316,522 A | 2/1982 | Hirschorn |
| 4,323,379 A | 4/1982 | Shearin |
| 4,472,184 A | 9/1984 | Neumann et al. |
| 4,488,888 A | 12/1984 | Doyle |
| 4,497,287 A | 2/1985 | Schleiermacher et al. |
| 4,498,914 A | 2/1985 | Ericksen |
| 4,519,823 A | 5/1985 | Kinney et al. |
| 4,521,234 A | 6/1985 | Peebles et al. |
| 4,555,255 A | 11/1985 | Kissel |
| 4,569,803 A | 2/1986 | Takakura et al. |
| 4,600,419 A | 7/1986 | Mattison |
| 4,608,066 A | 8/1986 | Cadwell, Jr. |
| 4,632,681 A | 12/1986 | Brunner |
| 4,648,311 A | 3/1987 | Slosiarek et al. |
| 4,701,196 A | 10/1987 | Delaney |
| 4,707,168 A | 11/1987 | Mizutani |
| 4,710,208 A | 12/1987 | Ziemer et al. |
| 4,808,203 A | 2/1989 | Sabourin |
| 4,846,859 A | 7/1989 | Nobiraki et al. |
| 4,860,420 A | 8/1989 | Cadwell et al. |
| 4,889,543 A | 12/1989 | Burt |
| 4,909,208 A | 3/1990 | Kristtics |
| 4,944,142 A | 7/1990 | Sueshig et al. |
| 4,946,484 A | 8/1990 | Monson et al. |
| 4,976,757 A | 12/1990 | Helmus |
| 4,978,375 A | 12/1990 | Il Yoo |
| 4,986,050 A | 1/1991 | Brunetti et al. |
| 5,003,974 A | 4/1991 | Mou |
| 5,014,608 A | 5/1991 | Benson et al. |
| 5,056,423 A | 10/1991 | Koukai et al. |
| 5,062,872 A | 11/1991 | Williams |
| 5,071,456 A | 12/1991 | Binder et al. |
| 5,088,299 A | 2/1992 | Peterson |
| 5,099,374 A | 3/1992 | Ohkita et al. |
| 5,140,819 A | 8/1992 | Napier et al. |
| 5,160,293 A | 11/1992 | Koukal et al. |
| 5,167,683 A | 12/1992 | Behrendt et al. |
| 5,273,564 A | 12/1993 | Hill |
| 5,279,632 A | 1/1994 | Decker et al. |
| 5,286,201 A | 2/1994 | Yu |
| 5,291,355 A | 3/1994 | Hatch et al. |
| 5,295,602 A | 3/1994 | Swanson |
| 5,313,759 A | 5/1994 | Chase, III |
| 5,331,748 A | 7/1994 | Miller, Jr. |
| 5,332,409 A | 7/1994 | Dralle |
| 5,358,379 A * | 10/1994 | Pepperman .............. B23P 6/005 415/191 |
| 5,379,609 A | 1/1995 | Matsumoto et al. |
| 5,394,786 A | 3/1995 | Gettle |
| 5,417,205 A | 5/1995 | Wang |
| 5,417,610 A | 5/1995 | Spransy |
| 5,421,307 A | 6/1995 | Andress et al. |
| 5,422,795 A | 6/1995 | Liu |
| 5,454,756 A | 10/1995 | Ludwig |
| 5,458,772 A | 10/1995 | Eskes et al. |
| 5,473,123 A | 12/1995 | Yazici et al. |
| 5,491,308 A | 2/1996 | Napier et al. |
| 5,512,074 A | 4/1996 | Hanni et al. |
| 5,512,086 A | 4/1996 | Glucksman |
| 5,514,197 A | 5/1996 | Den |
| 5,532,439 A | 7/1996 | Minkin |
| 5,554,203 A | 9/1996 | Borkent et al. |
| 5,575,826 A | 9/1996 | Gillingham et al. |
| 5,601,626 A | 2/1997 | Hori et al. |
| 5,602,700 A | 2/1997 | Viskochil et al. |
| 5,617,825 A | 4/1997 | Altmann et al. |
| 5,637,124 A | 6/1997 | Diachuk |
| 5,655,825 A | 8/1997 | Anoszko |
| 5,669,947 A | 9/1997 | Diachuk |
| 5,725,624 A | 3/1998 | Ernst et al. |
| 5,733,348 A | 3/1998 | Skarsten |
| 5,753,002 A | 5/1998 | Glucksman |
| 5,759,239 A | 6/1998 | Yu |
| 5,788,729 A | 8/1998 | Jurgensmeyer |
| 5,797,975 A | 8/1998 | Davis |
| 5,820,235 A | 10/1998 | Tsai |
| 5,824,125 A | 10/1998 | Sherwood |
| 5,833,727 A | 11/1998 | Sharsten |
| 5,871,556 A | 2/1999 | Jeanseau et al. |
| 5,904,744 A | 5/1999 | Kagan |
| 5,984,991 A | 11/1999 | Glucksman |
| 6,001,145 A | 12/1999 | Hammes |
| 6,099,612 A | 8/2000 | Bartos |
| 6,117,202 A | 9/2000 | Wetzel |
| 6,149,701 A | 11/2000 | Ellingson |
| 6,152,980 A | 11/2000 | Culwell |
| 6,190,431 B1 | 2/2001 | Jeanseau et al. |
| 6,260,658 B1 * | 7/2001 | Darrell .............. F01D 25/30 181/224 |
| 6,264,713 B1 | 7/2001 | Lewis, II |
| 6,267,793 B1 | 7/2001 | Gomez et al. |
| 6,270,546 B1 | 8/2001 | Jeanseau et al. |
| 6,293,983 B1 | 9/2001 | More |
| 6,309,296 B1 | 10/2001 | Schwenk et al. |
| 6,312,327 B1 | 11/2001 | Hachmann et al. |
| 6,319,300 B1 | 11/2001 | Chen |
| 6,337,782 B1 | 1/2002 | Guerin et al. |
| 6,339,521 B1 | 1/2002 | Durrum et al. |
| 6,351,920 B1 | 3/2002 | Hopkins et al. |
| 6,361,578 B1 | 3/2002 | Rubinson |
| 6,362,937 B1 | 3/2002 | Gibbs et al. |
| 6,371,846 B1 | 4/2002 | Powell et al. |
| 6,447,566 B1 | 9/2002 | Rivera et al. |
| 6,451,079 B1 | 9/2002 | Lange et al. |
| 6,485,538 B1 | 11/2002 | Toyoshima |
| 6,497,739 B2 | 12/2002 | McGill |
| 6,554,880 B1 | 4/2003 | Northcutt |
| 6,716,267 B2 | 4/2004 | Lawlor |
| 6,736,238 B2 | 5/2004 | Kerr |
| 6,858,055 B2 | 2/2005 | McGill |
| 7,077,835 B2 | 7/2006 | Robinson et al. |
| 7,097,692 B2 | 8/2006 | Southland et al. |
| 7,108,251 B2 | 9/2006 | Mueller |
| 7,117,910 B2 | 10/2006 | Akahori |
| 7,128,771 B2 | 10/2006 | Harden |
| 7,258,196 B2 | 8/2007 | Radatus et al. |

(56) References Cited

U.S. PATENT DOCUMENTS

| | | |
|---|---|---|
| 7,261,757 B2 | 8/2007 | Duffy |
| 7,323,028 B2 | 1/2008 | Simmons |
| 7,332,012 B2 | 2/2008 | O'Connor |
| 7,410,520 B2 | 8/2008 | Nowak |
| 7,413,587 B2 | 8/2008 | Beier |
| 7,422,613 B2 | 9/2008 | Bockle et al. |
| 7,452,396 B2 | 11/2008 | Terlson et al. |
| 7,537,630 B2 | 5/2009 | Schuld et al. |
| 7,581,619 B1 | 9/2009 | Storm |
| 7,588,618 B2 | 9/2009 | Osborne et al. |
| 7,588,629 B2 | 9/2009 | Osborne et al. |
| 7,662,216 B1 | 2/2010 | Terms et al. |
| 7,670,401 B2 | 3/2010 | Whittemore |
| 7,686,869 B2 | 3/2010 | Wiser et al. |
| 7,776,122 B2 | 8/2010 | Feldmann |
| 7,901,476 B2 | 3/2011 | Kao |
| 7,901,479 B2 | 3/2011 | Osborne et al. |
| 7,972,401 B2 | 7/2011 | Stock et al. |
| 7,976,604 B2 | 7/2011 | Desjardins |
| 8,048,186 B2 | 11/2011 | Mann et al. |
| 8,052,770 B2 | 11/2011 | Ayshford et al. |
| 8,087,491 B2 | 1/2012 | Merchant et al. |
| 8,105,409 B2 | 1/2012 | Mann et al. |
| 8,240,427 B2 | 8/2012 | Jangili et al. |
| 8,240,429 B1 | 8/2012 | Singhal |
| 8,579,074 B2 | 11/2013 | Kosaka et al. |
| 8,714,303 B2 | 5/2014 | Honji et al. |
| 9,309,842 B2 | 4/2016 | Watson et al. |
| 9,534,725 B1 | 1/2017 | Tecson et al. |
| 10,119,469 B2 | 11/2018 | Ponyavin et al. |
| 2002/0134061 A1 | 9/2002 | McGill |
| 2002/0139098 A1 | 10/2002 | Beier |
| 2003/0075923 A1 | 4/2003 | Lepoutre |
| 2004/0025996 A1 | 2/2004 | Akahori |
| 2005/0044828 A1 | 3/2005 | Southland et al. |
| 2005/0173815 A1 | 8/2005 | Mueller |
| 2005/0194206 A1 | 9/2005 | Rose et al. |
| 2005/0204713 A1 | 9/2005 | Wu et al. |
| 2005/0279064 A1 | 12/2005 | Simmons |
| 2005/0284113 A1 | 12/2005 | Jang et al. |
| 2006/0059828 A1* | 3/2006 | Stevenson ............... B29C 73/06 52/514 |
| 2006/0091243 A1 | 5/2006 | Hoffmann |
| 2006/0121768 A1 | 6/2006 | Dworatzek et al. |
| 2006/0168925 A1 | 8/2006 | Whittemore |
| 2007/0044441 A1 | 3/2007 | Troxell et al. |
| 2007/0084168 A1 | 4/2007 | Ashwood et al. |
| 2007/0169448 A1 | 7/2007 | Osborne et al. |
| 2007/0199289 A1 | 8/2007 | Bland, Jr. |
| 2007/0199449 A1 | 8/2007 | Wiser et al. |
| 2007/0204576 A1 | 9/2007 | Terlson et al. |
| 2007/0220851 A1 | 9/2007 | Parker et al. |
| 2007/0220854 A1 | 9/2007 | Feldmann |
| 2008/0184996 A1 | 8/2008 | Colorado |
| 2009/0113862 A1 | 5/2009 | Connor et al. |
| 2009/0320426 A1 | 12/2009 | Braunecker et al. |
| 2010/0139225 A1 | 6/2010 | Mammarella et al. |
| 2010/0192528 A1 | 8/2010 | Mann et al. |
| 2010/0229514 A1 | 9/2010 | Ayshford et al. |
| 2010/0251678 A1 | 10/2010 | Mann et al. |
| 2010/0251681 A1 | 10/2010 | Gebert |
| 2010/0263964 A1 | 10/2010 | Kosaka et al. |
| 2011/0061968 A1 | 3/2011 | Helenius et al. |
| 2012/0297783 A1 | 11/2012 | Melton et al. |
| 2013/0168180 A1 | 7/2013 | Merchant et al. |
| 2014/0212265 A1 | 7/2014 | Putnam |
| 2016/0010557 A1* | 1/2016 | Matsuyama ............ F01D 25/30 60/805 |
| 2017/0174356 A1* | 6/2017 | Lucas ................... B64D 33/02 |
| 2018/0195435 A1 | 7/2018 | Zhang et al. |
| 2018/0223733 A1 | 8/2018 | Zhang et al. |

FOREIGN PATENT DOCUMENTS

| | | |
|---|---|---|
| CA | 1322535 A1 | 9/1993 |
| CA | 2147206 A1 | 10/1995 |
| CA | 2204538 C | 3/2001 |
| CA | 2479329 A1 | 3/2005 |
| CA | 2496056 A1 | 10/2005 |
| CA | 2551701 | 12/2006 |
| CA | 2512414 | 1/2007 |
| CA | 2565992 | 4/2007 |
| CA | 2227816 C | 8/2007 |
| CA | 2602631 | 3/2008 |
| CN | 1169382 A | 1/1998 |
| CN | 1752553 A | 3/2006 |
| CN | 1932278 | 3/2007 |
| CN | 1963166 A | 5/2007 |
| DE | 4211303 A1 | 10/1993 |
| DE | 4412474 A1 | 10/1995 |
| DE | 4438007 A1 | 5/1996 |
| DE | 4412474 C2 | 8/1997 |
| DE | 10002343 A1 | 7/2000 |
| DE | 20216538 U1 | 2/2003 |
| DE | 20218457 U1 | 3/2003 |
| DE | 10332984 A1 | 2/2005 |
| DE | 10339082 A1 | 3/2005 |
| DE | 102005031501 A1 | 1/2007 |
| DE | 102006056225 A1 | 6/2008 |
| EP | 0065064 A2 | 11/1982 |
| EP | 0065064 A3 | 1/1984 |
| EP | 0065064 B1 | 11/1986 |
| EP | 0225448 A1 | 6/1987 |
| EP | 0232640 A1 | 8/1987 |
| EP | 0318636 A1 | 6/1989 |
| EP | 0398091 A1 | 11/1990 |
| EP | 0453657 A2 | 10/1991 |
| EP | 0453657 A3 | 10/1992 |
| EP | 0318636 B1 | 11/1992 |
| EP | 0555761 A1 | 8/1993 |
| EP | 0560298 A2 | 9/1993 |
| EP | 0620133 A1 | 10/1994 |
| EP | 0634203 A2 | 1/1995 |
| EP | 0634203 A3 | 4/1995 |
| EP | 0560298 A3 | 8/1995 |
| EP | 0398091 B1 | 1/1996 |
| EP | 0699465 A2 | 3/1996 |
| EP | 0555761 B1 | 4/1996 |
| EP | 0699465 A3 | 5/1996 |
| EP | 0735266 A1 | 10/1996 |
| EP | 0765517 A1 | 10/1996 |
| EP | 0620133 B1 | 9/1997 |
| EP | 0765517 A4 | 1/1998 |
| EP | 0818337 A2 | 1/1998 |
| EP | 0634203 B1 | 8/1998 |
| EP | 0856093 A1 | 8/1998 |
| EP | 0560298 B1 | 6/1999 |
| EP | 0951335 A1 | 10/1999 |
| EP | 0818337 A3 | 12/1999 |
| EP | 0699465 B1 | 2/2001 |
| EP | 0765517 B1 | 5/2001 |
| EP | 1184268 A2 | 3/2002 |
| EP | 0818337 B1 | 8/2002 |
| EP | 0951335 B1 | 5/2003 |
| EP | 1184268 A3 | 10/2003 |
| EP | 1184268 B1 | 10/2007 |
| EP | 1884277 A1 | 2/2008 |
| EP | 3 144 489 A1 | 3/2017 |
| EP | 3144489 A1 | 3/2017 |
| FR | 2823989 A1 | 10/2002 |
| FR | 2823989 B1 | 7/2003 |
| GB | 682845 | 11/1952 |
| GB | 724179 | 2/1955 |
| GB | 759992 | 10/1956 |
| GB | 1045309 A | 10/1966 |
| GB | 1072791 | 6/1967 |
| GB | 1082503 | 9/1967 |
| GB | 1104643 A | 2/1968 |
| GB | 1190959 | 5/1970 |
| GB | 1367734 A | 9/1974 |
| GB | 2302292 A | 1/1997 |

(56) References Cited

FOREIGN PATENT DOCUMENTS

| | | |
|---|---|---|
| GB | 2302292 B | 2/1998 |
| GB | 2340596 A | 2/2000 |
| GB | 2340596 B | 7/2002 |
| GB | 2415398 A | 12/2005 |
| GB | 2415398 B | 7/2008 |
| JP | 57007219 A2 | 1/1982 |
| JP | 57031738 A2 | 2/1982 |
| JP | 60060433 A2 | 4/1985 |
| JP | 60060435 A2 | 4/1985 |
| JP | 60066811 U1 * | 5/1985 |
| JP | 61240039 A2 | 10/1986 |
| JP | 63009742 A2 | 1/1988 |
| JP | 2140525 | 5/1990 |
| JP | 2252185 A2 | 10/1990 |
| JP | 3207935 | 9/1991 |
| JP | 5141645 A2 | 6/1993 |
| JP | 5141689 | 6/1993 |
| JP | 7098149 A2 | 4/1995 |
| JP | 8224417 A2 | 9/1996 |
| JP | 8226574 A2 | 9/1996 |
| JP | 9075640 | 3/1997 |
| JP | 9155158 A2 | 6/1997 |
| JP | 9173892 A2 | 7/1997 |
| JP | 9184656 A2 | 7/1997 |
| JP | 9287812 A2 | 11/1997 |
| JP | 9330557 A2 | 12/1997 |
| JP | 11059861 | 3/1999 |
| JP | 11169614 A2 | 6/1999 |
| JP | 2001227814 | 8/2001 |
| JP | 2002210426 | 7/2002 |
| JP | 2003190049 A2 | 7/2003 |
| JP | 2003334410 A2 | 11/2003 |
| JP | 2004167323 A2 | 6/2004 |
| JP | 2005103356 A2 | 6/2004 |
| JP | 2006003002 A2 | 1/2006 |
| JP | 2006132895 A2 | 5/2006 |
| JP | 2006305508 A2 | 11/2006 |
| JP | 2007046588 A2 | 2/2007 |
| JP | 2007132607 A2 | 5/2007 |
| JP | 2007296481 A2 | 11/2007 |
| KR | 20010048149 A | 6/2001 |
| KR | 20020025646 A | 4/2002 |
| KR | 20020055182 A | 7/2002 |
| KR | 20030034003 A | 5/2003 |
| KR | 20030079893 A | 10/2003 |
| KR | 20030093063 A | 12/2003 |
| KR | 20040076781 A | 9/2004 |
| MX | 9601164 A | 2/1997 |
| MX | PA02011936 A | 6/2004 |
| MX | PA5007008 A | 2/2006 |
| RO | 117217 B1 | 11/2001 |
| RO | 118492 B1 | 5/2003 |
| RU | 2130521 C1 | 5/1999 |
| RU | 2209736 C2 | 8/2003 |
| RU | 2236122 A1 | 9/2004 |
| SK | 280735 B6 | 7/2000 |
| TW | I247078 B | 1/2006 |
| WO | WO 89/07225 A1 | 8/1989 |
| WO | 91/05157 A1 | 4/1991 |
| WO | WO 96/32714 A1 | 10/1996 |
| WO | WO 98/07949 A1 | 2/1998 |
| WO | WO 01/81740 A1 | 11/2001 |
| WO | WO 02/066272 A2 | 8/2002 |
| WO | WO 2005/076922 A2 | 8/2005 |
| WO | WO 2005/076922 A3 | 8/2005 |
| WO | WO 2006/080689 A1 | 8/2006 |
| WO | WO 2007/042194 A1 | 4/2007 |
| WO | WO 2008/030138 A2 | 3/2008 |
| WO | WO 2008/030138 A3 | 3/2008 |
| WO | WO 2008/068327 A1 | 6/2008 |

OTHER PUBLICATIONS

U.S. Appl. No. 15/267,001, filed Sep. 15, 2016, Valery Ivanovich Ponyavin.

Extended European Search Report and Opinion issued in connection with corresponding EP Application No. 17190601.9 dated Feb. 5, 2018.

* cited by examiner

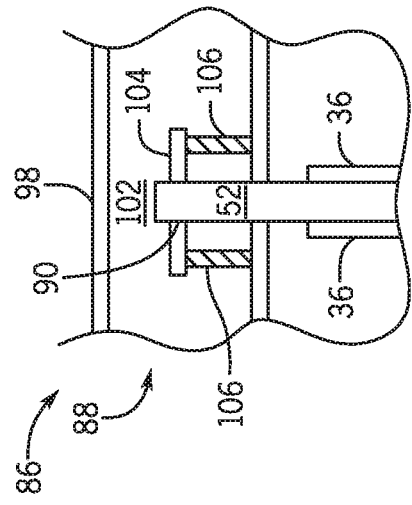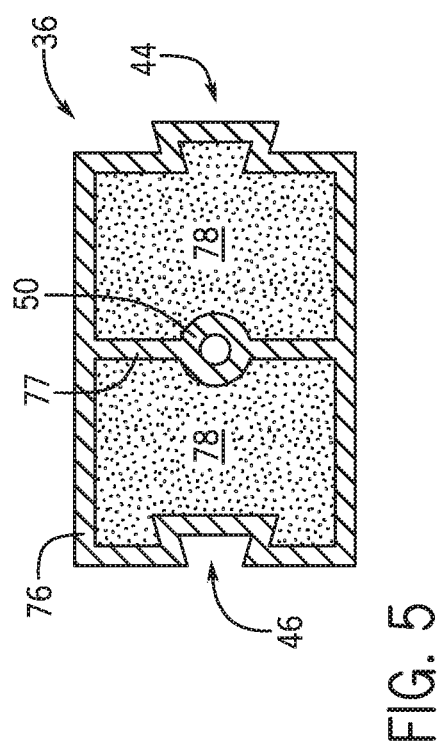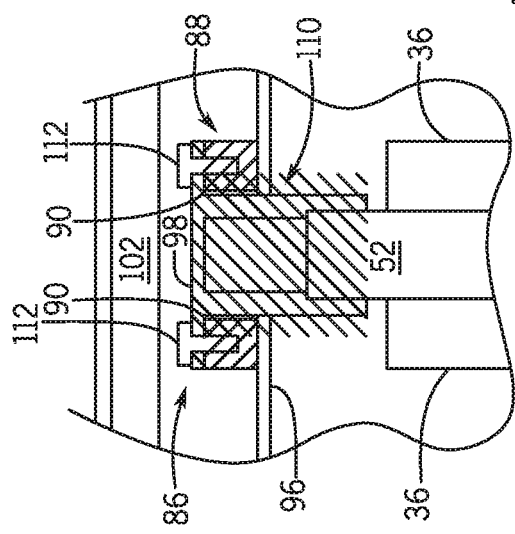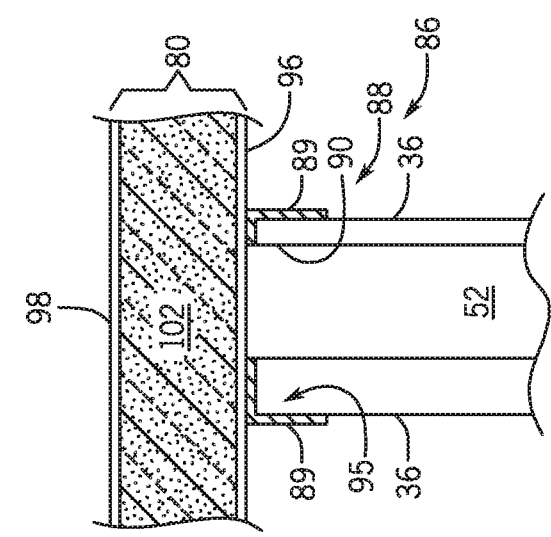

METHOD FOR INSTALLING AND REMOVING MODULARIZED SILENCER BAFFLES

BACKGROUND

The subject matter disclosed herein relates to systems and methods for silencing noise within an air duct for a gas turbine engine.

Power generation equipment, such as a gas turbine engine, can use a large supply of intake air to support the combustion process. To maintain suitable performance of the turbine, the intake air is filtered to remove unwanted dust, moisture, and other contaminants before the air is compressed in a compressor. The large volume of air that moves through the intake air housing and an air duct can generate significant noise and cause vibration of the intake air housing and other equipment. Moreover, the blade passing frequency of the compressor and the inlet bleed heating system may contribute to the noise and vibration. In context of turbine engines, it is generally undesirable to add to the vibration of the engine. As such, it is desirable to reduce noise and vibration caused by the intake air moving through the intake air housing and the air duct.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a conduit having a fluid flow path and a silencer baffle disposed in the fluid conduit along the fluid flow path, where the silencer baffle has a plurality of baffle sections coupled together via mating interlock structures.

In a second embodiment, a system includes a first baffle section of a silencer baffle configured to mount in a fluid conduit along a fluid flow path, where the first baffle section is coupled together with a second baffle section of the silencer baffle via mating interlock structures.

In a third embodiment, a method includes assembling a silencer baffle configured to mount in a fluid conduit along a fluid flow path, where assembling the silencer baffle includes coupling together a plurality of baffle sections via mating interlock structures.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 5 is a perspective view of an embodiment of a single baffle shell of the plurality of baffle sections filled with a sound absorption material;

FIG. 12 illustrates an embodiment of a connector assembly taken within line 9-9 of FIG. 6;

FIG. 13 illustrates another embodiment of a connector assembly taken within line 9-9 of FIG. 6;

FIG. 14 illustrates another embodiment of a connector assembly taken within line 9-9 of FIG. 6;

DETAILED DESCRIPTION

Figure 1:
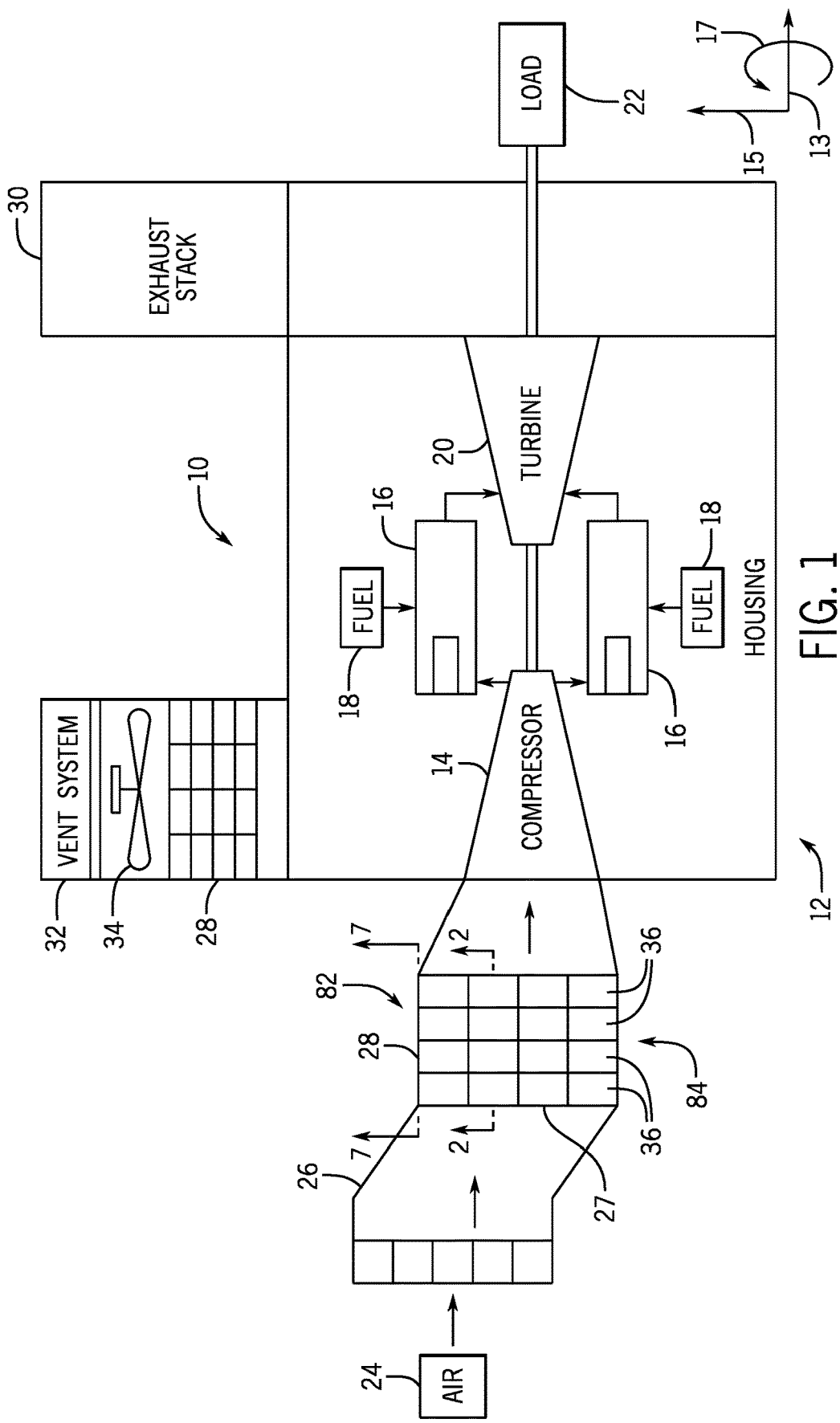
FIG. 1 is a schematic diagram of an embodiment of a power generation system with a silencer baffle having a plurality of modularized baffle sections disposed within an air duct of an inlet housing.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Embodiments of the claimed subject matter include a power generation system including a gas turbine engine, wherein the system includes a conduit (e.g., an intake or exhaust housing and duct) for flowing a fluid (e.g., air, recirculated exhaust gas, etc.) to a compressor. One or more silencer baffles is disposed in the housing or duct (e.g., intake or exhaust). The silencer baffles include a plurality of baffle sections aligned substantially linearly with one another. The baffle sections are coupled together via a lockable coupling, such as a mating interlock structures. The mating interlock structures may include a female joint portion and a male joint portion that secure adjacent baffle sections together when coupled. For example, the mating interlock structures may include mating rail portions, mating dovetail joints, mating hook and slot joints, mating latches, or any combination thereof. Two or more baffle sections are assembled to form a silencer baffle. The baffle sections of the silencer baffle may form a plurality of rows and columns when assembled and installed into the inlet air housing and/or air duct. The baffle sections may be used within an intake section (e.g., intake section, exhaust gas recirculation, intake section, etc.), an exhaust system, or any other suitable area (e.g., areas with suitable temperatures) of the power generation system.

The columns of the baffle sections are further stabilized by a rod disposed through a rod support passage disposed in the baffle section. The baffle sections are layered onto the rod one by one adjacent to each other. The mating interlock structure (e.g., male joint portion) of each baffle section is coupled or inserted to an adjacent baffle section via an adjacent mating interlock structure (e.g., female joint portion) after being layered onto the rod. The rod is then secured to the area of the power generation system where the silencer baffle is going to be used in (e.g., inlet air housing or inlet ducting). The rod is coupled to the area via its end portions. The end portions of the rods are coupled to a panel having a prefabricated mounting interface. The mounting interface includes a plurality of recesses (e.g., mounting receptacles) to receive the end portions of the rods. The ends of the rods are coupled to the mounting receptacles via connector assemblies, as described in detail below.

The silencer baffle includes a leading edge baffle section, a trailing edge baffle section, and intermediate sections disposed between the leading and trailing baffle sections. The perimeter of the silencer baffle gradually curves (e.g., tapers) from the leading baffle section to the trailing section, creating a more aerodynamic shape (e.g., an airfoil shaped baffle). In some embodiments, the perimeter of the silencer baffle may include a blunt trailing edge and/or a leading edge. The baffle sections may have patterns on exterior surfaces of the baffle sections. The patterns may include recesses and/or protrusions (e.g., dimples) and allow noise to be absorbed by acoustic materials (e.g., sound absorption materials) disposed within the baffle shell.

Turning now to the drawings, FIG. 1 is a schematic diagram of an embodiment of a power generation system 10 with a silencer baffle 28 including a plurality of baffle sections 36 disposed within an inlet air housing 26 having an intake duct (e.g., air duct 27) that uses modularized silencer baffle sections 36 disclosed herein. In the following discussion, reference may be made to various directions, including an axial direction or axis 13, a radial direction or axis 15, and/or a circumferential direction or axis 17. The power generation system 10 includes a gas turbine engine 12 having a compressor 14 and one or more combustors 16 to receive and combust a mixture of compressed oxidant (e.g., air 24) and fuel 18, and one or more turbines 20 driven by hot gases produced by combustion of the air-fuel mixture.

The hot combustion gases drive the turbine 20, which in turn drives the compressor 14 and one or more other loads 22. For example, in the illustrated embodiment, the gas turbine engine 12 may be coupled to a variety of loads 22, such as an electrical generator. The remaining hot gases exit through an exhaust stack 30 and are vented to the atmosphere. The gas turbine engine 12 draws intake gas 24 (e.g., oxidant such as ambient air) into the air compressor 14 through the air inlet housing 26 and the air duct 27. Although the illustrated embodiment depicts air 24, the intake gas 24 may include air, oxygen, oxygen-enriched air, oxygen-reduced air, exhaust recirculation gas (EGR), or any combination thereof. Nevertheless, the following discussion refers to air as a non-limiting example. As the intake air 24 enters the power generation facility 10, the intake air 24 first passes through, the air inlet housing 26 (e.g., in the axial direction 13) that is coupled to the gas turbine engine 12. The air inlet housing 26 includes a sidewall extending about an intake air passage, wherein the sidewall includes opposite sidewall portions or panels, such as a top panel 82 and a bottom panel 84. The silencer baffles 28 are secured to the top and bottom panels 82, 84 as described in detail below. Inside the inlet air housing 26, an array of silencer baffles 28 is utilized as described in detail below. The silencer baffles 28 may also be utilized in a vent system 32, or other area of the gas turbine engine 12, where the temperature of the gases is low enough to utilize the silencer baffles 28 made of non-metallic materials (e.g., plastics, composites, etc.). In other embodiments, the silencer baffles 28 may be made of metallic materials, or metallic/non-metallic composite materials. In one example, the vent system 32 may include a fan 34 to reduce the temperature of the gases being vented through the vent system 32 such that the silencer baffles 28 can be used.

Figure 2:
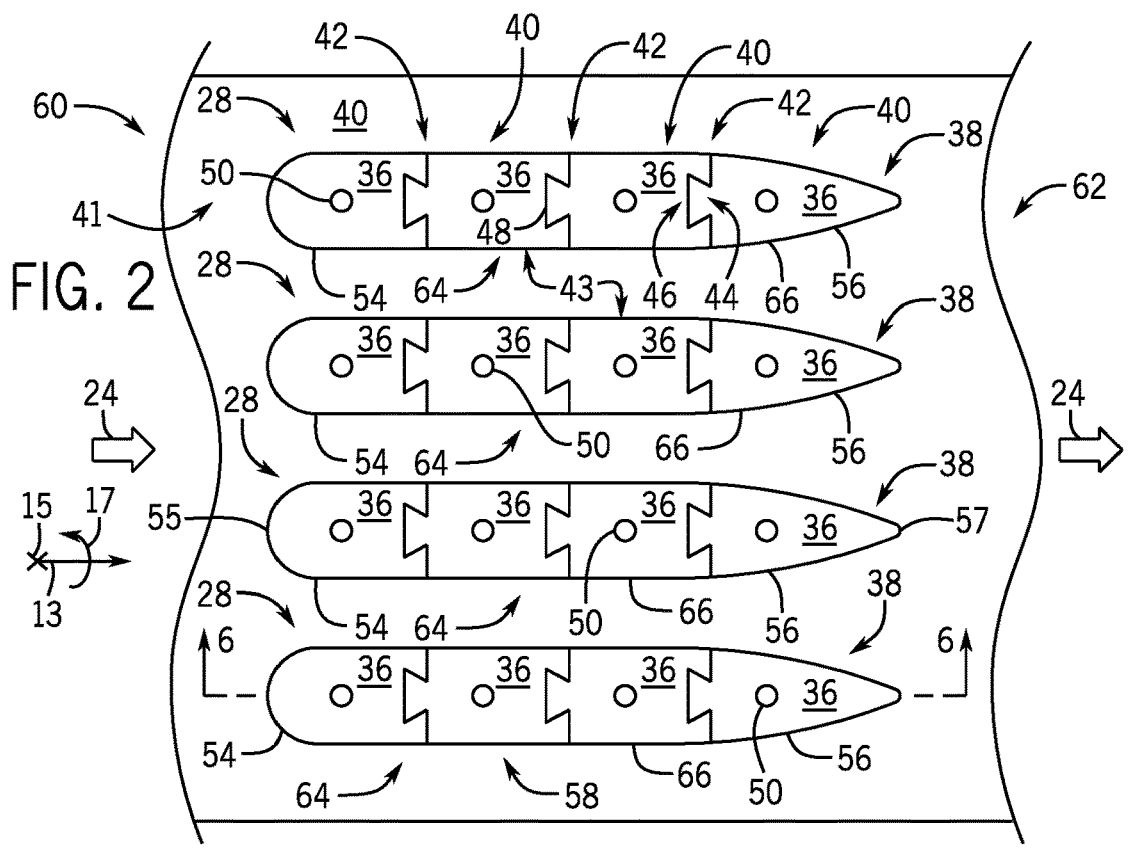
FIG. 2 is a cross-sectional view of an embodiment of the plurality of baffle sections of FIG. 1 taken along line 2-2, showing alignment of the baffle sections and a plurality of silencer baffles.

FIG. 2 is a cross-sectional view of an embodiment of the plurality of baffle sections 36 of FIG. 1 taken along line 2-2, showing alignment of the baffle sections in a plurality of silencer baffles 28. Though each silencer baffle 28 (e.g., rows of baffle sections 36) shows four baffle sections 36 aligned and interlocked with one another. Each of the silencer baffles 28 may include any number of baffle sections 36 in each row 38. For example, the silencer baffles 28 may include 2, 3, 4, 5, 6, 7, 8, or more baffle sections 36. The array of the silencer baffles 28 includes a plurality of rows 38 and a plurality of columns 40 (see FIG. 6) made up of modules (e.g., the baffle sections 36). In the illustrated embodiment, an equal number of rows 38 and columns 40 are utilized in each silencer baffle 28. However, it will be appreciated that in some embodiments, each silencer baffle 28 may include more rows 38 than columns 40 or vice versa. In the following discussion, the columns 40 may be referred to as panels 41 (e.g., vertically or radially stacked segments). The embodiments disclosed herein may use any number of panels 41. For example, there may be 2 to 50, 5 to 30, or 15 to 25 panels used in the power generation system 10. The panels 41 are aligned substantially parallel to one another and separated by a space 43.

The baffle sections 36 are coupled together via a plurality of lockable couplings, such as mating interlock structures 42. The mating interlock structures 42 may include mating joint structures (e.g., a male joint portion 44 and a female joint portion 46). The male joint portion 44 is disposed in the female joint portion 46 to increase rigidity of the coupling. The mating interlock structures 42 may include a rail joint, dovetail joint 48, a butt joint, a tongue in groove assembly, or any other suitable locking structure. For example, the joint portions 44 and 46 may include male and female portions, dovetail joint portions, latch portions, hook and slot portions, or any combination thereof. In the illustrated embodiment, the joint portions 44 and 46 may include a diverging male joint portion 44 and a diverging female joint portion 46 (e.g., diverging surfaces) that interlock with one another. The joint portions 44 and 46 may slidingly couple together in the radial direction 15, and thus may be described as mating rail portions. The baffle sections 36 are aligned adjacent to one another. In the illustrated embodiment, the baffle sections 36 are arranged linearly in the axial 13 and the radial directions 15 to form a grid like configuration or matrix.

Figure 6:
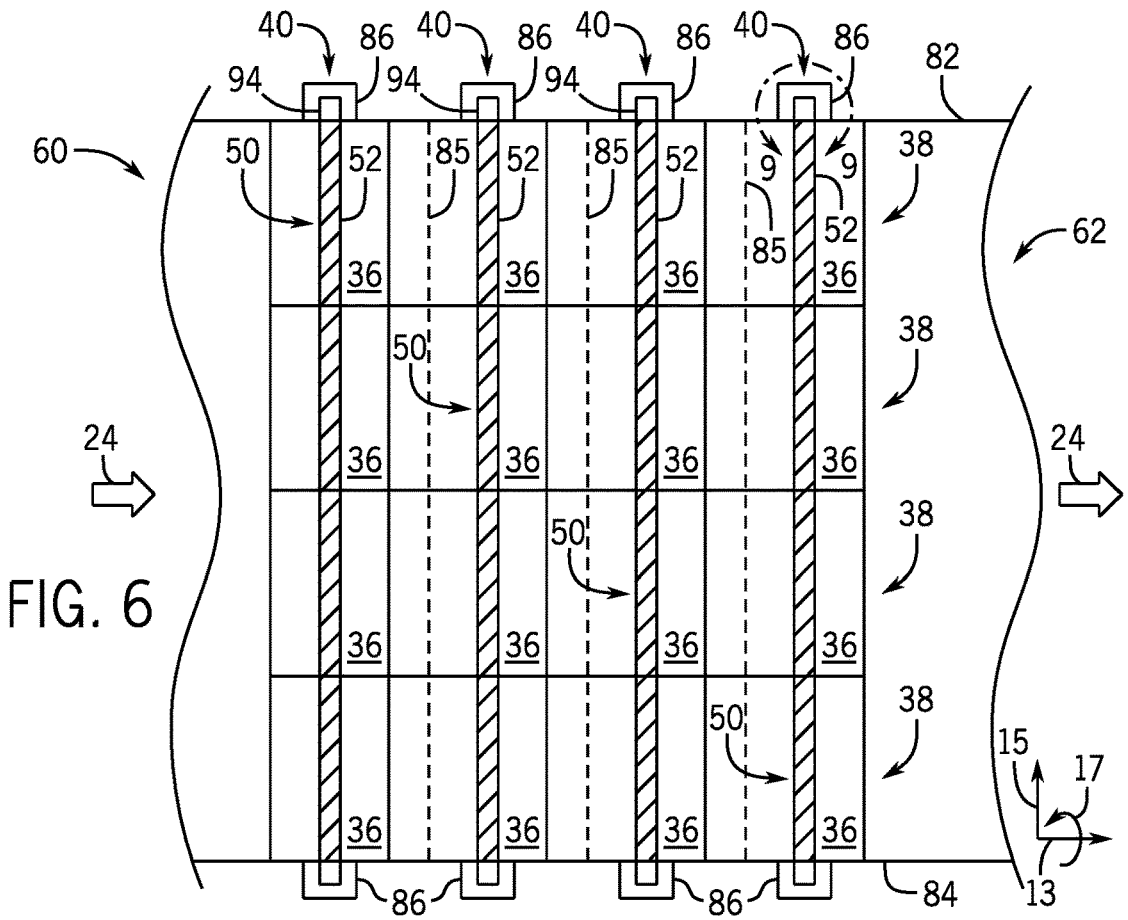
FIG. 6 is a cross-sectional view of an embodiment of the plurality of baffle sections of FIG. 2 taken along line 6-6 of FIG. 2, showing alignment of a plurality of rods disposed within the plurality of baffle sections via a plurality of rod support passages.

Each of the baffle sections 36 includes a rod support passage 50 (e.g., rod receptacle) to receive a support rod 52 (see FIG. 6). The rod support passage 50 may be circular, rectangular, square, or any other suitable geometry to receive the support rod 52. The support rods 52 secure the columns 40 of the baffle sections 36 together, as explained further with reference to FIG. 11. Each panel 41 may have a varying number of support rods 52. For example, the panel 41 may have 2, 3, 4, 5, 6, 7, 8 or more support rods 52. In some embodiments, not all of the rod support passages 50 are used. For example, the panel 41 may have rods 52 disposed in every other rod support passage 50, every two rod support passages 50, and so forth.

The silencer baffle 28 includes a leading edge baffle section 54 having a leading edge 55, a trailing edge section 56 having a trailing edge 57, and one or more intermediate baffle sections 58 disposed between the leading and trailing edge baffle sections 54, 56 in each row 38. The intake air 24 flows through from a first side 60 of the inlet air housing 26 to a second side 62. As the intake air 24 flows through the inlet air housing 26, the air flow is improved by the more aerodynamic shape of the silencer baffle 28. The baffle sections 36 may include a contoured exterior surface 64 between the leading edge section 54 and the trailing edge section 56 of the silencer baffle, thereby forming an airfoil shaped perimeter 66 of the silencer baffle 28. For example, the leading edge section 54 may be wider than the trailing edge section 56 and the intermediate sections 58. The baffle sections 36 may include various patterns 68 disposed on an exterior surface 70 of the baffle sections 36, as explained further with reference to FIGS. 3-4. The patterns 68 also may provide recesses or openings through which the inlet air 24 is blown through.

Figure 3:
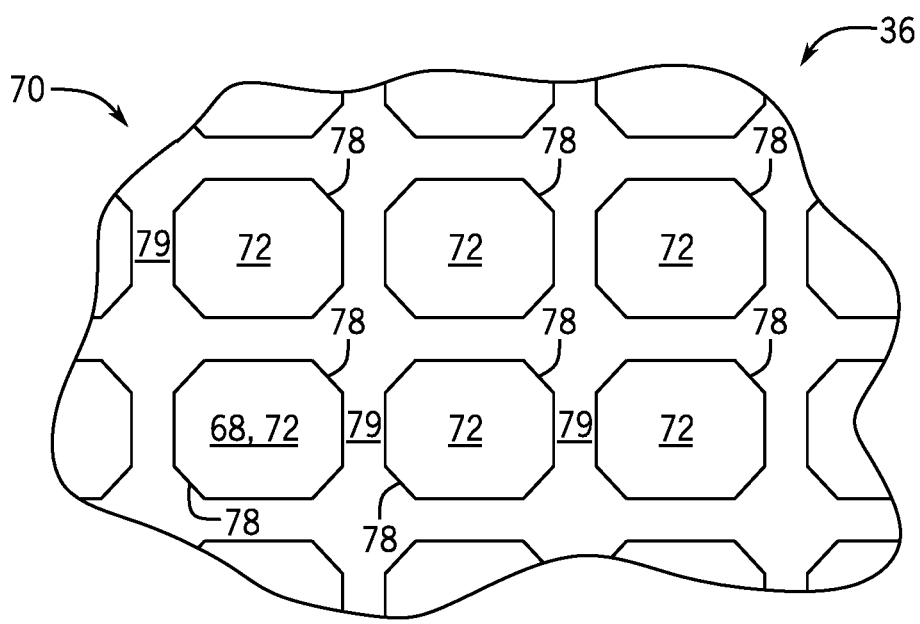
FIG. 3 is a close-up perspective view of an embodiment of an exterior surface of a baffle section of the silencer baffle.

FIG. 3 is a close-up perspective view of an embodiment of the exterior surface 70 of one or more baffle sections 36 (e.g., leading edge baffle section 54) of the silencer baffle 28. The pattern 68 disposed on the exterior surface 70 of the leading edge baffle section 54 includes a plurality of recesses or openings 72. The openings 72 may cover approximately 20 to 60%, 25 to 50%, 30 to 40%, and all percentages therebetween of the exterior surface 70 of one or more baffle sections 36. The openings 72 enable the inlet air 24 to be exposed to the openings and allows noise to be absorbed by acoustic materials 74 (e.g., sound absorption materials) disposed within an interior 76 (see FIG. 5) of the one or more baffle sections 36. The openings 72 may be disposed on any or all of the baffle sections 36, such as the leading edge baffle section 54, the trailing edge baffle section 56, and/or the intermediate baffle sections 58. In the illustrated embodiment, the opening 72 may have a substantially square or rectangular shape with one or more rounded or chamfered edges 78. In other embodiments, the openings 72 may have other shapes including ovals, circles, triangles, hexagons, or combination thereof. The adjacent openings 72 may by a space or a rib 79, which may be flush or protruding relative to the exterior surface 70 and/or the openings 72. In certain embodiments, the ratio of the width of the opening 72 to the rib 79 may be approximately 10:1 to 1:1, 8:1 to 2:1, or 3:1 to 1.5:1, or any ratios therebetween.

Figure 4:
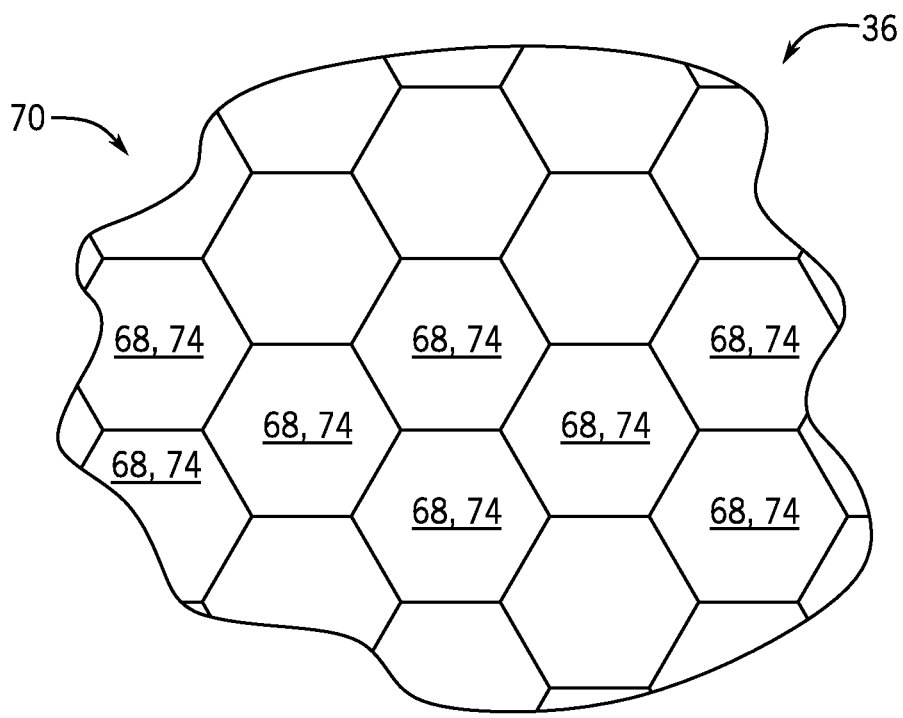
FIG. 4 is a close-up perspective view of an embodiment of an exterior surface of a trailing edge baffle section of the silencer baffle.

FIG. 4 is a close-up perspective view of an embodiment of the exterior surface 70 of the one or more baffle sections 36 of the silencer baffle 28. The exterior surface 70 may include one or more patterns 68 configured to increase turbulence and/or to reduce flow separation of the inlet air 24 relative to the exterior surface, such as along the trailing edge baffle sections 56. In the illustrated embodiment, the pattern 68 includes a dimple pattern 74. In certain embodiments, the dimple pattern 74 creates turbulent flow of the air at least around the trailing edge section 56, thereby delaying flow separation near the trailing edge section 56. The dimple pattern 74 may include a plurality of polygonal shapes (e.g., hexagonal shapes, octagonal shapes, etc.), circular shapes, or any other suitable geometry, such that the dimple creates turbulent flow.

FIG. 5 is a perspective view of an embodiment of a single baffle section 36 of the plurality of baffle sections 36 having a baffle shell 76 filled with a sound absorption material 78. As shown, the baffle shell 76 includes an outer shell portion 75, an inner structural support 77, and the rod support passage 50 (e.g., along support 77) to receive the support rod 52. The baffle shell 76 may be formed by injection molding, transfer molding, or any other suitable process. The baffle shell 76 may be constructed of suitable materials including plastics, such as acrylonitrile butadiene styrene, polypropylene, polyethylene, PVC, CPVC, or other suitable thermoplastic polymers. In some embodiments, the baffle shell 76 may be formed of composite materials (e.g., a reinforcement material distributed throughout a matrix material). The sound absorption material 78 may include mineral woods, basalt wool, fiberglass, melamine foam, polyurethane foam, or other suitable materials. As explained above, the baffle sections 36 are arranged in columns 40 (e.g., stacked one over another in radial direction 15) and coupled together in rows 38 (e.g., interlocked in axial direction 13) via the mating interlock structures 42 (e.g., the male joint portion 44, the female joint portion 46). The sound absorption material 78 may be cut to a suitable shape and size and inserted into the baffle shell 76 to function as a noise attenuation component. In other embodiments, the sound absorption material 78 may be injected into the baffle shell 76. The baffle shells 76 may be formed individually and slid onto the rod 52 to form an integral silencer baffle 28. The sound absorption material 78 may be placed into the baffle shell 76 before or after being threaded (e.g., assembled) on the rod 52.

FIG. 6 is a cross-sectional view of an embodiment of the plurality of baffle sections 36 of FIG. 2 taken along line 6-6, showing alignment of a plurality of rods 52 disposed within the plurality of baffle sections 36. The dashed lines 85 represent the overlap and interlocking of the male joint portion 44 with the female joint portion 46 when the mating interlock structure 42 is coupled together (e.g., slidingly coupled together) in the radial direction 15. The rods 52 may constrain the panels 80, 82, 84 and function as a load bearing element to reduce the load on the panels 80, 82, 84. As discussed above, the rods 52 may be circular, square, rectangular, or any other suitable geometry. In the illustrated embodiment, the rods 52 have a diameter of approximately 3.81 centimeters (1.5 inches), though the diameter may vary. The diameter of the rods 52 may vary to fit the opening or rod support passages 50. As discussed above, the rods 52 are disposed through rod support passages 50 to stabilize the columns 40 (e.g., the baffle sections 36). The rods 52 couple to adjacent panels 80 (e.g., a top panel 82, a bottom panel 84) of the inlet air housing 26 by end portions 94 of the rod 52. Each of the rods 52 is secured to the adjacent panels 80 via a plurality of connector assemblies 86. Various embodiments of the connector assemblies 86 may be further understood with reference to FIGS. 9 and 12-14.

Figure 7:
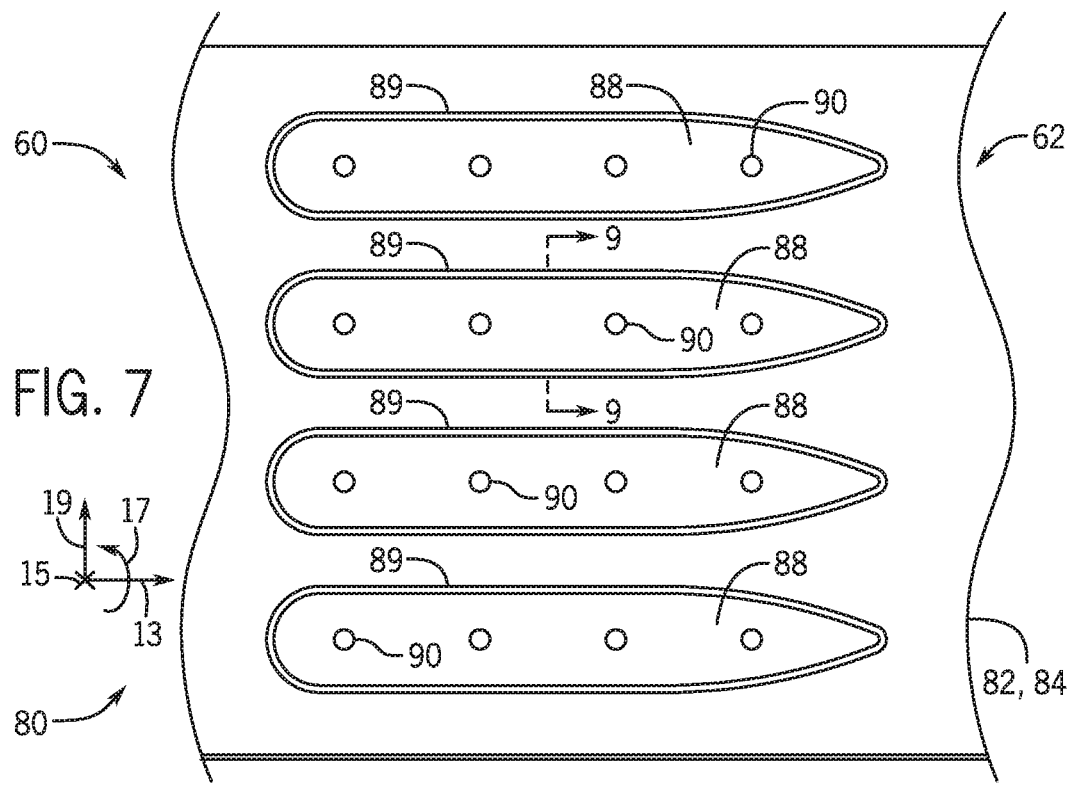
FIG. 7 is a cross-sectional view of an embodiment of a panel or sidewall having a plurality of mounting interface structures configured to receive an end of a respective rod via a plurality of mounting receptacles, wherein the panel is disposed along a top or a bottom side of the inlet air housing of FIG. 1 taken along line 7-7.
Figure 8:
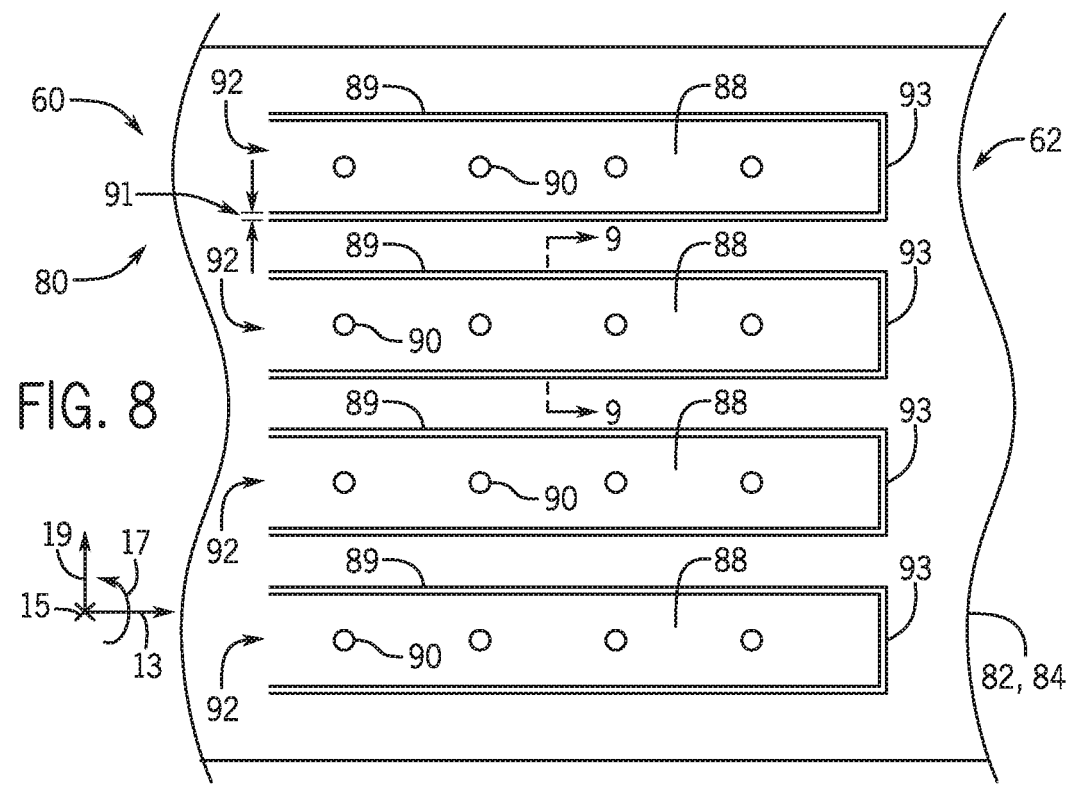
FIG. 8 is a cross-sectional view of an embodiment of a panel or sidewall having a plurality of mounting interfaces configured to receive the ends of the rods via a plurality of mounting receptacles, wherein the mounting interfaces have an open end and where the panel is disposed along the top or the bottom side of the inlet air housing of FIG. 1 taken along line 7-7.

FIGS. 7-8 illustrate cross-sectional views of embodiments of the wall portion of panel 80 of the housing 26 and/or duct 27 of FIG. 1 taken along line 7-7, illustrating a plurality of mounting interfaces 88 disposed in the panels 80. It may be appreciated that the mounting interfaces 88 may not be utilized in some embodiments. The mounting interfaces 88 may include various openings (e.g., receptacles) to receive a portion of the rods 52 (e.g., end portions 94). The mounting interface 88 may be flat (e.g., flush with the panel 80), recessed into the panel 80, and/or or protruding outward from the panel 80. In some embodiments, the mounting interface 88 may include an outer border or rim 89 in the panel 80 or which may be recessed or protruding from the panel 80 to define a perimeter of the mounting interface 88. FIG. 7 is a cross-sectional view of an embodiment of a panel 80 comprising a plurality of mounting interfaces 88 configured to receive the ends 94 of the rods 52 via a plurality of mounting receptacles 90, wherein the panel 80 is disposed along the top 82 or the bottom 84 side of the inlet air housing 26 of FIG. 1 taken along line 7-7. During assembly, each column 40 of the baffle sections 36 is assembled by radially stacking the baffle sections 36 over one another along a support rod 52 disposed in the receptacle 90 in one of the panels 80 (e.g., a bottom panel 84). Subsequently, each additional column 40 of baffle sections 36 is assembled by sliding each successive baffle section 36 along the mating interlock structure 42 between adjacent columns 40 with or without simultaneously sliding the successive baffle sections 36 along an additional support rod 52. After the desired number of columns 40 of baffle sections are assembled in the housing 26, the end portion 94 of each rod 52 is inserted (see FIG. 9) into the mounting receptacle 90 in an opposite panel 80 (e.g., a top panel 82). The end portion 94 of each rod 52 is then locked into the mounting receptacle 90 via the connector assembly 86. The mounting interfaces 88 may be prefabricated into both panels 80 (e.g., the top panel 82, the bottom panel 84) via metal stamping, casting, machining, and/or welding a separate structure onto the panels 80.

FIG. 8 is a cross-sectional view of an embodiment of a panel 80 comprising mounting a plurality of mounting interfaces 88 configured to receive the ends 94 of the rods 52 via a plurality of mounting receptacles 90, wherein the mounting interfaces 88 have an open end 92 and wherein the panel 80 is disposed along a top 82 or bottom 84 side of the inlet air housing 26 of FIG. 1 taken along line 7-7. In the illustrated embodiment, each mounting interface 88 has an outer border or rim 89 with a constant width 91 from the open end to a closed end 93. For example, the rim 89 may define a rail mount structure, which blocks movement of the silencer baffles 28 in the crosswise direction 19. In the illustrated embodiment, the mounting interface 88 includes the open end 92 so that the baffle sections 36 (e.g., individual baffle sections 36, preassembled rows 38, and/or columns 40 of baffle sections 36) can be slid axially 13 into the mounting interface 88 one-by-one in a modular fashion (e.g., assembling by layering the baffle sections 36). The columns 40 of the baffle sections 36 (and each entire silencer baffle 28) can then be further stabilized by inserting one or more rods 52 through one or more rod support passages 50 and then into the mounting receptacles 90, as shown more clearly in FIG. 9.

Figure 9:
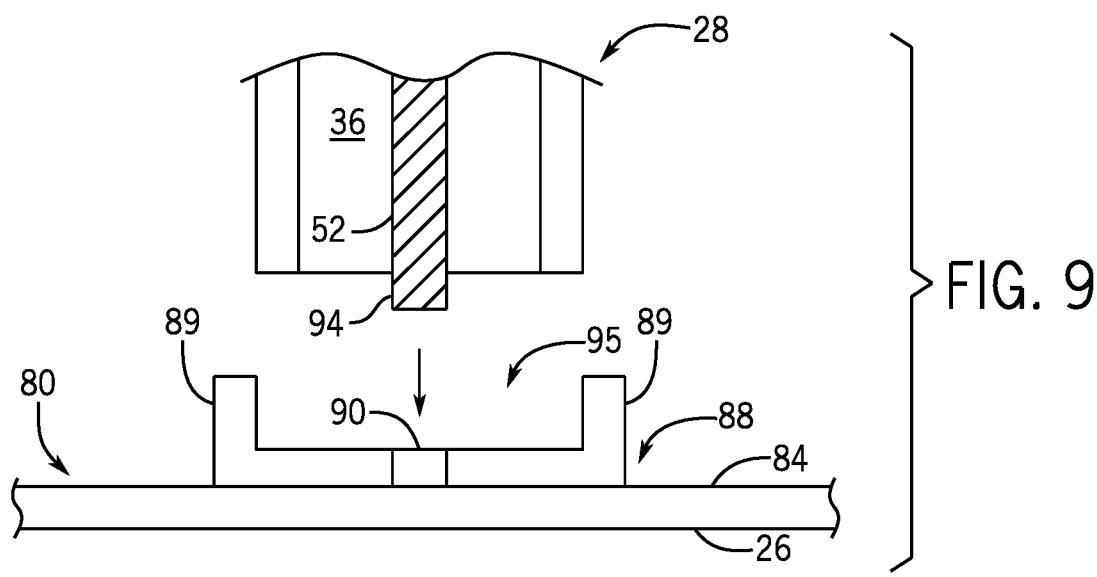
FIG. 9 is a partial perspective view of an embodiment of a mounting receptacle taken within line 9-9 of FIG. 6.

FIG. 9 is a close-up perspective view of an embodiment of the mounting interface 88 taken within line 9-9 of FIG. 6, illustrating a baffle section 36 of the silencer baffle 28 being installed into a space 95 between portions of the rim 89. For example, the illustrated mounting interface 94 may be disposed on one or both of the opposite panels 80 (e.g., top panel 82 and/or bottom panel 84) of the housing 26. In certain embodiments, the mounting interface 94 may be the same or different panels 82, 84. The mounting receptacle 90 receives the end portion 94 of the rod 52. In some embodiments, the rods 52 are then secured (e.g., locked) into place by the connector assemblies 86 (see FIGS. 12-14) at one or both of the opposite panels 80 (e.g., panels 82, 84). When the silencer baffle 28 is to be replaced, the rod 52 is removed near the end portion 94 to remove the column 40 of baffle sections 36. Some of the connector assemblies 86 may result in detachable couplings, while other configurations result in semi-permanent couplings. In the case of a detachable coupling, the rod 52 may be removed by uncoupling the connector assembly 86. In the case of a semi-permanent connection, the rod 52 may be removed by cutting a weld with a torch or other suitable apparatus. In certain embodiments, at least one of the opposite panels 80 (e.g., the top panel 82) may be removable to enable top installation and removal through an access opening.

Figure 10:
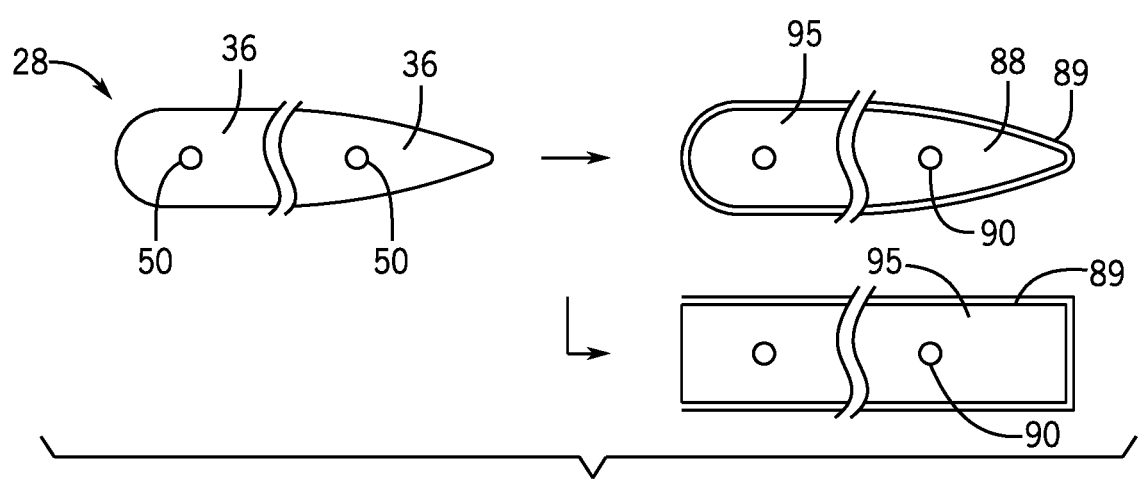
FIG. 10 is a close-up perspective view of an embodiment of the silencer baffle, wherein the silencer baffle is configured to move radially and/or axially into the mounting interface structure.

FIG. 10 is a close-up perspective view of an embodiment of the silencer baffle 28, wherein the silencer baffle 28 is translated into the mounting interface 88 (e.g., radially into the closed airfoil shaped interface or axially into an open-ended rail interface). As described above, the silencer baffle 28 may be comprised of any number of baffle sections 36. The silencer baffle 28 may be assembled by assembling the columns 40. Each column 40 includes a plurality of the baffle sections 36. The baffle sections 36 are assembled along the rod 52 by sliding the baffle sections 36 one by one onto the rod 52 through the rod support passage 50. The baffle sections 36 are coupled (e.g., snapped together, fitted together) by the female and male joint portions 44, 46. After the desired number of columns 40 of baffle sections 36 are formed, the rod 52 is inserted into the mounting receptacles 90 of the mounting interface 88, as described above.

In another embodiment, the mounting interface 88 includes the open end 92 so that the baffle sections 36 can be slid axially into the mounting interface 88 one-by-one or row by row in a modular fashion. In other words, the baffle sections 36 may be positioned (e.g., aligned) in the mounting interface 88. The baffle sections 36 are aligned so that the rod support passages 50 are substantially aligned with one another. The baffle sections 36 are coupled (e.g., snapped together, fitted together) by the female and male joint portions 44, 46. The columns 40 of the baffle sections 36 can then be further stabilized by inserting the rod 52 through the rod support passages 50. The end portions 94 of the rods 52 may then be secured to the mounting receptacles 90, as described above.

Figure 11:
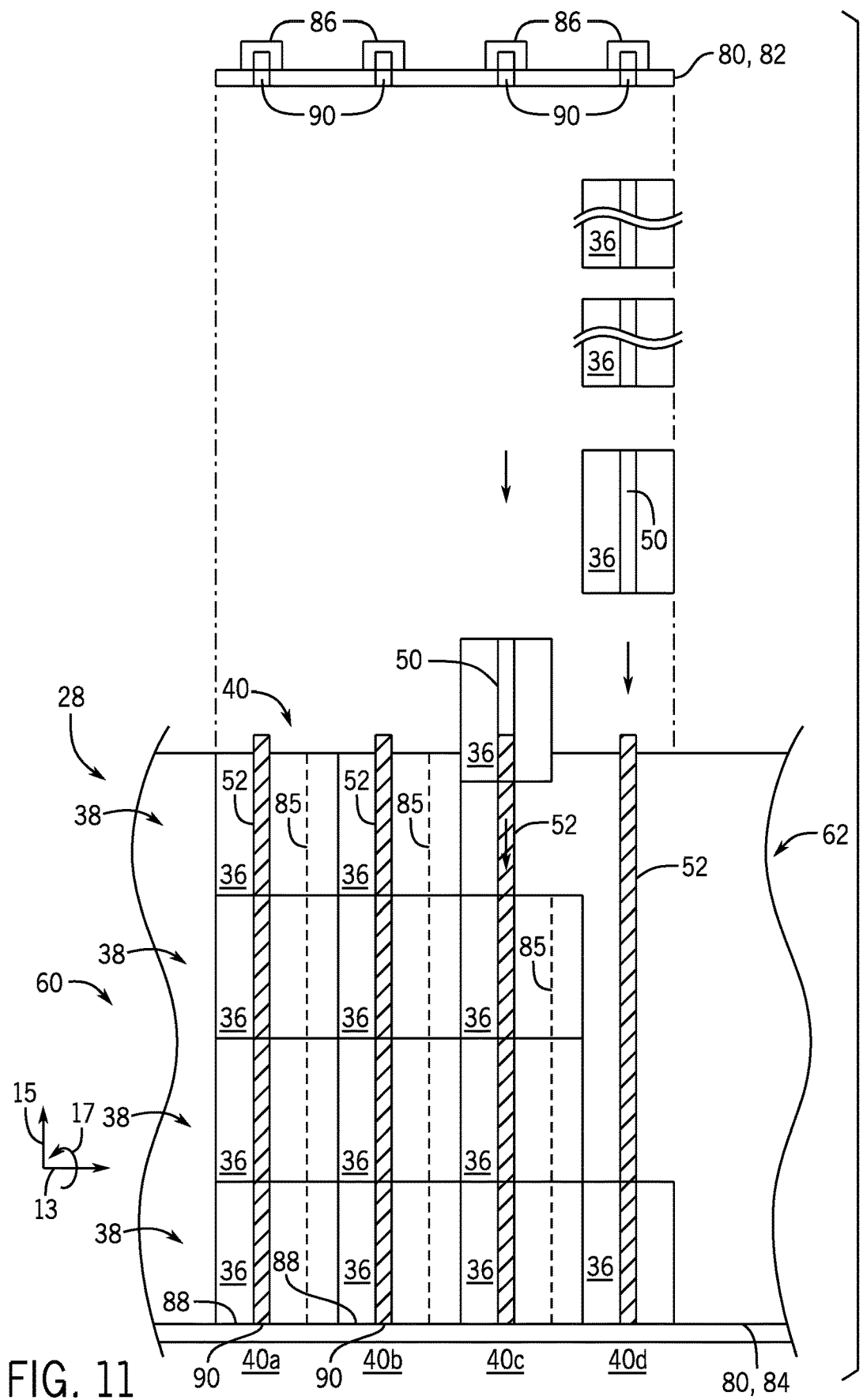
FIG. 11 illustrates an embodiment of a partially assembled silencer baffle of FIG. 1 illustrating an assembly process for a silencer baffle.

FIG. 11 illustrates an embodiment of a partially assembled silencer baffle 28 of FIG. 1. The baffle sections 36 are layered in the radial direction 15 onto each of the rods 52 one-by-one. In the illustrated embodiment, the columns 40*a*, 40*b* are fully assembled. The column 40*d* is partially assembled with only one baffle section 36 on the rod 52. The dashed lines 85 indicate overlap of adjacent baffle sections 36 via the mating interlock structures 42 (e.g., male joint portion 44 and the female joint portion 46). Locking the mating interlock structures 42 further stabilizes the baffle sections 36 into the aligned columns 40 and rows 38. Locking the mating interlock structures 42 may include inserting the male joint portion 44 into the female joint portion 46, snapping the joint portions 44, 46 together, fitting the joint portions 44, 46 together, or any other suitable manner of coupling. The column 40*c* illustrates a column partially assembled column 40 of the baffle sections 36, with a final baffle section 36 being installed at the top of the column 40*c*. As shown, each rod 52 is coupled to the bottom panel 84. As described above, the bottom panel 84 is prefabricated with mating interfaces 88 and mating receptacles 90. Each rod 52 may be secured to the mating receptacle 90 prior to the baffle sections 36 being slid onto the rod 52. The baffle sections 36 are then slid onto the rod 52 via the rod support passages 50 until the desired number of baffle sections 36 are stacked onto the rod 52 to complete each column 40. The process is repeated for each column 40 of the baffle sections 36, while each adjacent pair of columns 40 of baffle sections 36 may also simultaneously interlock with one another with the interlock structures 42. As illustrated, the interlock structures 42 are configured to engage one another in the radial direction 15 simultaneous with lowering of the baffle sections 36 onto the rod 52 in the radial direction 52. After all of the baffle sections 36 are assembled to define the desired number of silencer baffles 28, the top panel 80, 82 may be installed over the silencer baffle 28 to capture the silencer baffle 28 between opposite panels 80. The top panel 80, 82 also secures the rods 52 via insertion of the rods 52 into receptacles 90 in the top panel 80, 82. In some embodiments, the baffle sections 36 may be arranged (e.g., layered) adjacent to each other, and the rod 52 may be slid into the baffle sections 36 by sliding the rod 52 through the aligned rod support passages 50. In other embodiments, the silencer baffle 28 may be assembled by assembling the baffle sections 36 in the axial direction, as described above with reference to FIG. 10. In this embodiment, the baffle sections 36 may be fully layered (e.g., assembled) in the axial direction. The rod 52 may then be disposed through the adjacent baffle sections 36 by inserting the rod 52 through the rod support passages 50.

FIGS. 12-14 illustrate various embodiments of the connector assemblies 86 utilized to couple the end portion 94 of the rod 52 to the mounting receptacles 90. The connector assemblies 86 may be semi-permanent couplings, such as welding, brazing, fusing, or a combination thereof. The connector assemblies 86 may be removable couplings, such as fasteners (e.g., threaded receptacles, bolts, nuts, etc.), clamps, or any combination thereof. The connector assemblies 86 may also serve to block the rod 52 from inadvertently loosening over time due to vibration.

FIG. 12 illustrates an embodiment of the connector assembly 86, wherein the connector assembly 86 couples the rod 52 to the mounting receptacle 90 in the mounting interface 88. In the illustrated embodiment, the rod 52 is inserted radially 15 into the mounting receptacle 90, while the silencer baffle 28 is disposed within the rim 89. The mounting interface 88 is coupled to an inner wall 96 of the panel 80 (e.g., top panel 82). The inner wall 96 of the panel 80 is thermally isolated from an outer wall 98 of the panel 80 (e.g., top panel 82) by a layer of insulation 102. The layer of insulation 102 may vary in thickness. The insulation 102 may be the same insulation material that is utilized inside the baffle shells 76, or it may be different. The mounting interface 88 may be removably or fixedly coupled to the panel 80 via removable fasteners (e.g., threaded fasteners, clamps, male/female joints, etc.) or fixed joints (e.g., welds, brazed joints, etc.)

FIG. 13 illustrates another embodiment of the connector assembly 86, wherein the connector assembly 86 couples the rod 52 to the mounting receptacle 90. The inner wall 96 of the panel 80 is separated from the outer wall 98 of the receiving structure by a layer of insulation 102. The connector assembly 86 includes a perforated panel or a washer 104. The washer 104 may support the load associated with the rod 52 and baffle sections 36 within the mounting interface 88. The rod 52 is contained by at least one sleeve 106 that couple to the washer 104. The sleeve 106 reduces movement of the rod 52 within the mounting interface 88. In the illustrated embodiment, the end portion 94 of the rod 52, the washer 104, and the sleeve 106 are contained within the panel 80 between the inner wall 96 and the outer wall 98 (e.g., recessed into the panel 80 within the insulation 102). When the rod 52 and silencer baffle 28 (e.g., assembled baffle sections 36) are removed from the inlet air housing 26, the rod 52 is cut adjacent the end portion 94 and the washer 104, the end portion 94, and the sleeves 106 remain inside the inner wall 96 and the outer wall 98 of the mounting interface 88.

FIG. 14 illustrates another embodiment of the connector assembly 86, wherein the connector assembly 86 couples the rod 52 to the mounting receptacle 90. The inner wall 96 of the panel 80 is separated from the outer wall 98 of the panel 80 by a layer of insulation 102. A pair of removable fasteners, such as a pair of bolts 112, is inserted through the inner wall 96. The pair of bolts 112 may be disposed through a portion of the mounting receptacle 90. The mounting receptacle 90 is disposed outside the inner wall 96 and may include a rod guide 110. The rod guide 110 may be used to align the rod 52 within the mounting receptacle 90. In the illustrated embodiment, the connector assembly 86 may include the washer 104 to support the load of the rod 52.

Figure 15:
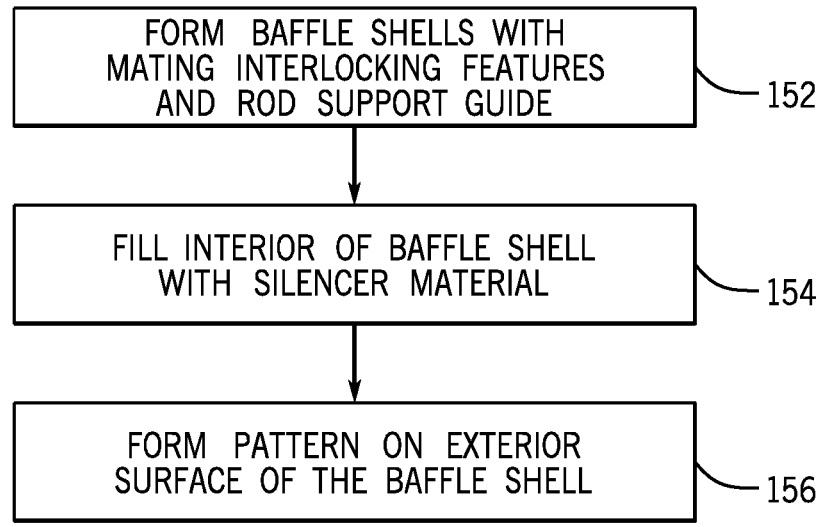
FIG. 15 illustrates a method of manufacturing the baffle sections in accordance with the embodiments disclosed herein.

FIG. 15 illustrates a method 150 of manufacturing the baffle sections 36 in accordance with the embodiments disclosed herein. The method 150 includes forming (block 152) the baffle shell 76 with mating interlock features 42 and one or more rod support passages 50. As described above, the baffle shell 76 may be manufactured via injection molding, transfer molding, or another suitable method. The method 150 includes filling (block 154) an interior portion of the baffle shell 76 with the silencer material 80. In some embodiments, the interior portion of the baffle shell 76 may be injected with the silencer material 80, or the silencer material 80 may be cut and inserted into the baffle shell 76. The silencer material may include various foams, such melamine foam, polyurethane foam, or other suitable foam materials. The method 150 includes forming (block 156) a pattern 68 on the exterior surface 70 of the baffle shell 76. The pattern 68 may include recesses, openings 72, protrusions or dimples 74, or a combination thereof. It may be appreciated in some embodiments, some of the steps may be performed in a single step. For example, the method 150 may include includes forming (block 152) the baffle shell 76 with mating interlock features 42 and one or more rod support passages 50 forming (block 156) the pattern 68 on the exterior surface 70 of the baffle shell 76 at once.

Figure 16:
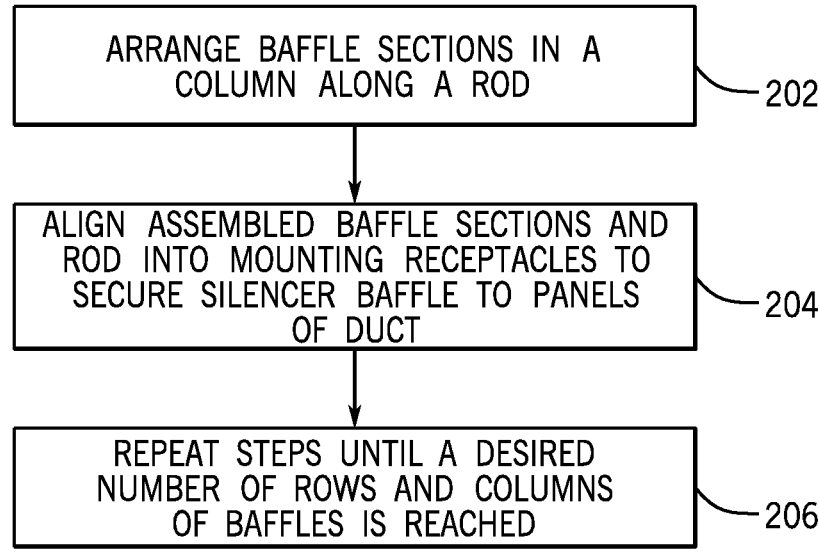
FIG. 16 illustrates a method of installing the silencer baffles in accordance with the embodiments disclosed herein.

FIG. 16 illustrates a method 200 of installing the silencer baffles 28 in accordance with the embodiments disclosed herein. The method 200 includes installing (block 202) the silencer baffles 36 in a column 40 along the rod 52. The method 200 may include inspecting, servicing, repairing, and/or replacing one or more of the baffle sections 36 during installation. The silencer baffles 36 include rod support passage 50, so that the silencer baffles 36 can slide radially onto the rod 52. Adjacent columns 40 of the baffle sections 36 are coupled together (e.g., snapped together, fitted together) by the female and male joint portions 44, 46. The method 200 includes aligning (block 204) the assembled silencer baffle 28 (e.g., the rod 52 with silencer baffles 36) with the mounting receptacles 90 that are prefabricated on the panels 80 (e.g., top panel 82, bottom panel 84) of inlet air housing 26. The method 200 includes repeating (block 206) the steps of installing the silencer baffles 36 and aligning the assembled silencer baffle 28 until the desired number of rows 38 and columns 40 is reached.

Figure 17:
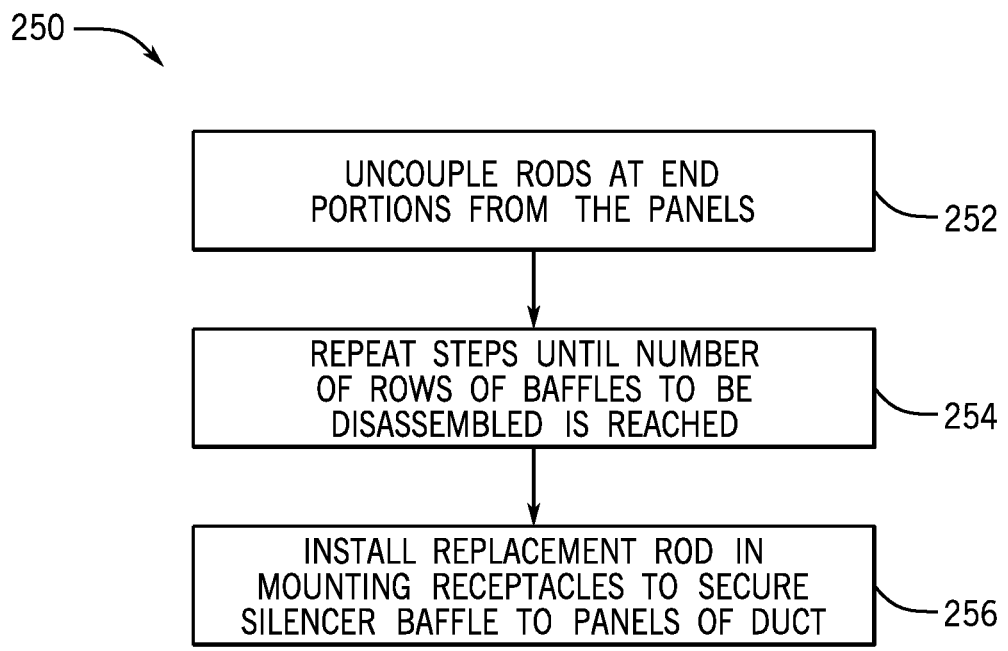
FIG. 17 illustrates a method of removing the silencer baffles in accordance with the embodiments disclosed herein.

FIG. 17 illustrates a method 250 of removing the silencer baffles 28 in accordance with the embodiments disclosed herein. The method 250 may include inspecting, servicing, repairing, and/or replacing one or more of the baffle sections 36 during removal. The method 250 include uncoupling (block 252) the rods 52 at end portions 94 from the panels 80. Uncoupling the rods 52 includes uncoupling the connector assemblies 86. As described above for detachable couplings, each rod 52 may be removed by uncoupling the connector assembly 86. For example, the rods 52 may be removed by unthreading threaded fasteners, removing the top panel 80, 82, removing clamps, or any combination thereof. In the case of a semi-permanent connection, the rod 52 may be removed by cutting a weld with a torch, a blade, or an abrasive tool. The method 250 includes repeating (block 254) uncoupling the rods 52 until number of rows of baffles to be disassembled is reached. The method 250 includes installing (block 256) a newly assembled (e.g., replacement) rod 52 in the mounting receptacles 90 to secure silencer baffles 28 to panels 80 of the air inlet housing (e.g., duct). In some embodiments, the step of installing (block 256) a replacement rod 52 may be optionally omitted.

Technical effects of the subject matter include forming silencer baffles 28 by assembling a plurality of baffle sections 36 within the air intake conduit of a gas turbine engine 12. Each silencer baffle 28 includes a leading edge baffle section 54, a trailing edge baffle section 56, and one or more intermediate sections 60 disposed between the leading and trailing baffle sections 54, 56. The baffle sections 36 may have patterns 68 on exterior surfaces of the baffle sections 36. The patterns 68 (e.g., openings) serve to allows noise to be absorbed by acoustic materials 74 (e.g., sound absorption materials) disposed within the baffle shell 76. The baffle sections 36 are assembled in rows 38 and columns 40 to form silencer baffles 28. Each baffle section 36 include a male joint portion 44 and/or a female joint portion 46 that couples to a corresponding joint portion 44, 46 on an adjacent baffle section 36. Each of the baffle sections may also include a rod support passage 50 configured to receive a rod 52. The rod 52 further stabilizes the male and female joint portions 44, 46. The rods 52 with the baffle sections 36 are installed in the inlet air housing 26 or other suitable location of the power generation system 10. In accordance with the present disclosure, the end portions 94 of the rod 52 are coupled to a mounting interface 88 via mounting receptacles 90. The rods 52 are coupled to the mounting receptacles 90 via the connector assemblies 86. The rods 52 may be replaced to maintain or replace the baffle sections 36 when the baffle sections 36 are to be maintained, repaired, replaced, accessed, or otherwise inspected.

This written description uses examples to disclose the claimed subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
 assembling a plurality of baffle sections in first and second directions to form a silencer baffle configured to mount in a fluid conduit along a fluid flow path, wherein assembling the silencer baffle comprises:
 arranging the plurality of baffle sections in the first direction along at least one rod extending through an interior surrounded by a baffle shell of each baffle section of the plurality of baffle sections;
 coupling together the plurality of baffle sections against one another in a plurality of rows via mating interlock structures along opposing sides of adjacent baffle sections of the plurality of baffle sections, wherein each row of the plurality of rows is oriented in the second direction, wherein coupling together the plurality of baffle sections comprises slidingly engaging the mating interlock structures of the adjacent baffle sections of the plurality of baffle sections in the first direction such that the opposing sides move parallel to one another, and the mating interlock structures block separation of the adjacent baffle sections in the second direction crosswise to the first direction; and
 stacking the plurality of baffle sections against one another in the first direction in a plurality of columns crosswise to the plurality of rows, wherein the first direction is oriented along an axis of each column of the plurality of columns.

2. The method of claim 1, wherein arranging the plurality of baffle sections in the first direction along at least one rod comprises arranging the plurality of baffle sections along an axis of the at least one rod.

3. The method of claim 1, wherein assembling the silencer baffle comprises stacking the plurality of columns of baffle sections along the at least one rod, and coupling together the plurality of rows of baffle sections via the mating interlock structures.

4. The method of claim 1, comprising installing the silencer baffle inside the fluid conduit, and coupling the at least one rod to opposite first and second panels of the fluid conduit.

5. The method of claim 1, wherein coupling together the plurality of baffle sections comprises forming an airfoil shape of the silencer baffle, wherein the second direction extends from a leading edge to a trailing edge of the airfoil shape, wherein the first direction extends along the leading edge.

6. The method of claim 1, wherein the silencer baffle comprises a pattern along an exterior surface of one or more of the plurality of baffle sections, and the pattern has a plurality of openings, a plurality of recesses, a plurality of protrusions, or a combination thereof.

7. The method of claim 1, wherein each baffle section of the plurality of baffle sections has a sound absorption material disposed within an outer shell.

8. The method of claim 1, comprising:
inspecting the silencer baffle after installation in the fluid conduit; and
servicing, repairing, or replacing one or more baffle sections of the plurality of baffle sections of the silencer baffle.

9. The method of claim 1, wherein arranging the plurality of baffle sections in the first direction along at least one rod comprises inserting a first rod in the first direction through a first rod passage in each baffle section of a first series of baffle sections of the plurality of baffle sections.

10. The method of claim 9, wherein arranging the plurality of baffle sections in the first direction along at least one rod comprises inserting a second rod in the first direction through a second rod passage in each baffle section of a second series of baffle sections of the plurality of baffle sections, and the first and second rods are laterally offset from one another in the second direction crosswise to the first direction.

11. The method of claim 1, wherein coupling together the plurality of baffle sections comprises coupling together male and female joint portions of the mating interlock structures of adjacent baffle sections of the plurality of baffle sections in the first direction.

12. The method of claim 11, wherein the male and female joint portions comprise male and female rail portions, male and female dovetail joint portions, or a combination thereof.

13. The method of claim 1, wherein coupling together the plurality of baffle sections comprises coupling together a leading edge baffle section and a trailing edge baffle section in the first direction.

14. The method of claim 13, wherein coupling together the plurality of baffle sections comprises coupling together one or more intermediate baffle sections between the leading and trailing edge baffle sections in the first direction.

15. The method of claim 1, comprising installing the silencer baffle in the fluid conduit coupled to a machine.

16. The method of claim 15, wherein the machine comprises a turbine engine.

\* \* \* \* \*